April 3, 1945.  F. G. LEWIS  2,372,902
BALED HAY LOADER
Filed Feb. 28, 1944  3 Sheets-Sheet 1

INVENTOR
Fred. G. Lewis
BY
ATTYS

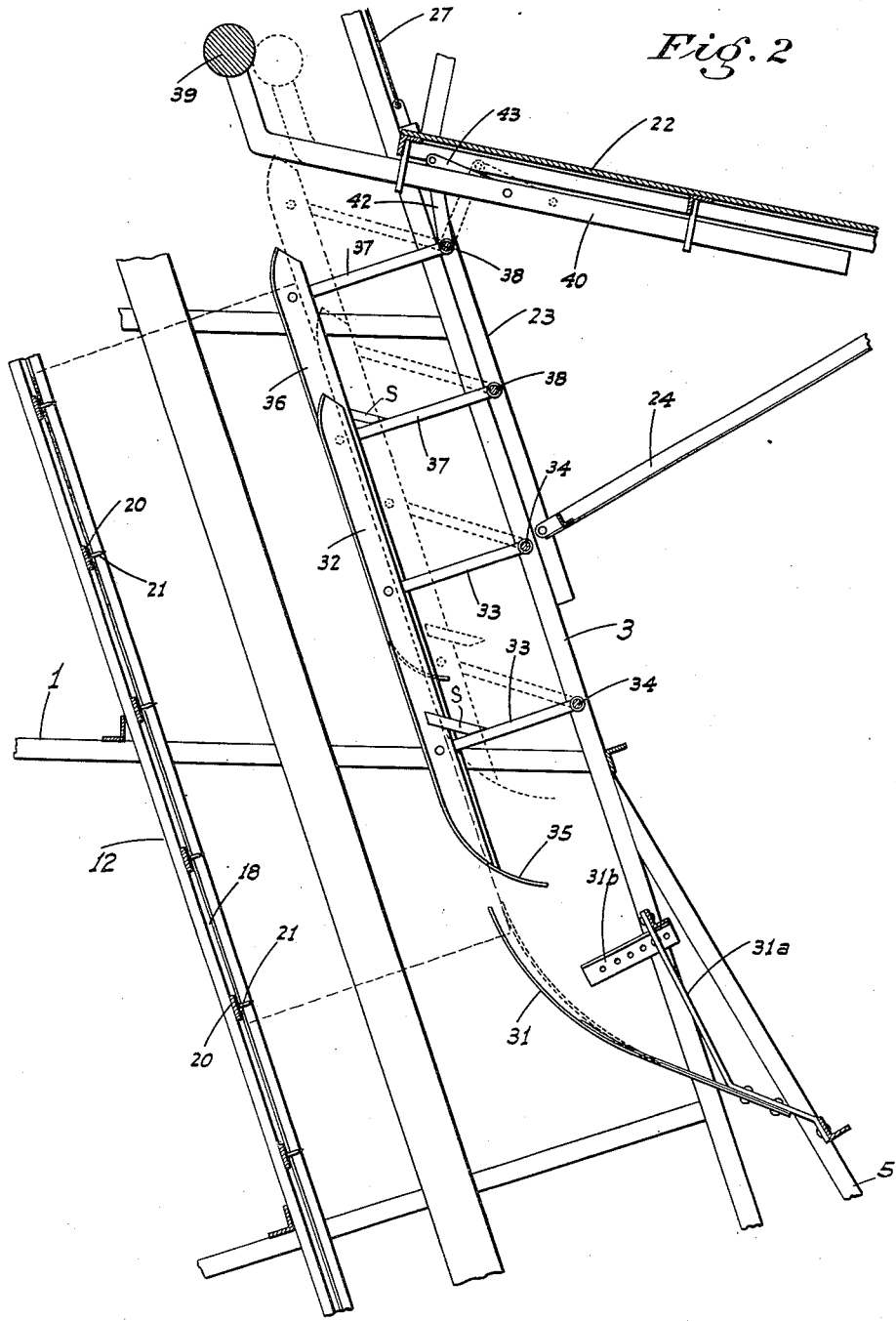

April 3, 1945.   F. G. LEWIS   2,372,902
BALED HAY LOADER
Filed Feb. 28, 1944   3 Sheets-Sheet 3
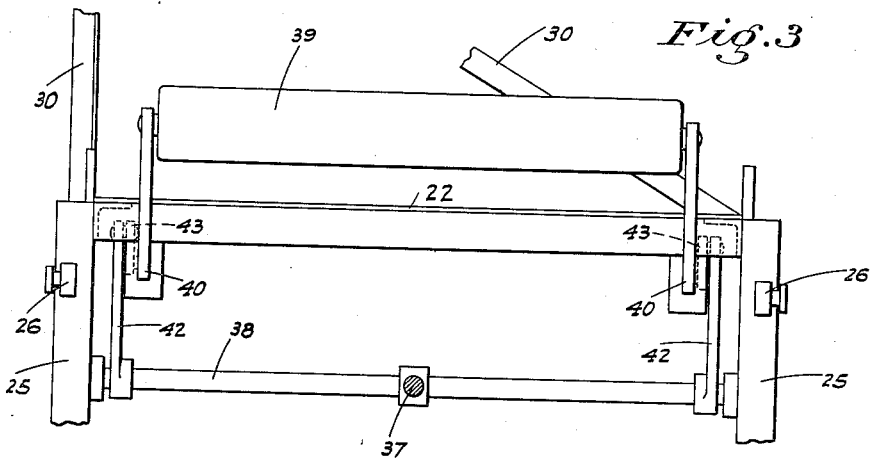
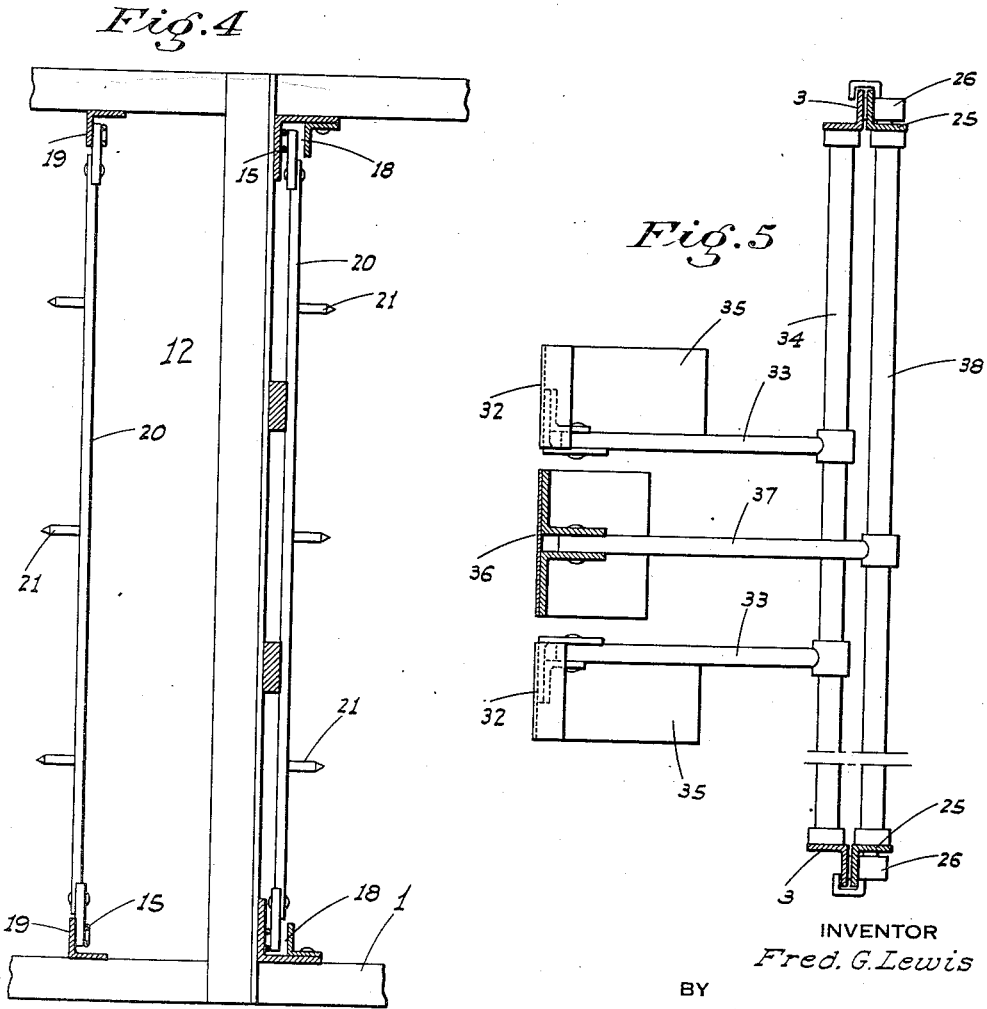
INVENTOR
Fred. G. Lewis
BY
ATTYS Patented Apr. 3, 1945

2,372,902

UNITED STATES PATENT OFFICE 2,372,902

BALED HAY LOADER

Frederick G. Lewis, Stockton, Calif., assignor to Harris Manufacturing Company, Stockton, Calif., a corporation of California Application February 28, 1944, Serial No. 524,188

14 Claims. (Cl. 198—13)

This invention relates in general to an improved baled hay loader, and in particular the invention is directed to, and it is an object to provide, a baled hay loader which is wheel-supported and adapted to be connected in draft relation to and alongside a truck, onto the bed of which the baled hay is to be deposited; the implement including an elevator conveyor driven from the ground engaging wheels, and said implement being operative to pick up bales from the ground and to elevate the same to a position above and to one side of the truck whereby a workman can readily transfer the bale to the latter.

A further object of the present invention is to provide a baled hay loader, of the type described, which includes an upstanding frame from which a substantially horizontal bale receiving platform projects lengthwise of the direction of travel, said platform being vertically adjustable to properly position the same relative to the bed of the truck; there being an elevator conveyor carried by the upstanding frame operative to elevate bales from the ground to said platform.

An additional object of this invention is to provide a baled hay loader, as in the preceding paragraph, in which the elevator conveyor is disposed at a relatively steep incline; there being a novel presser shoe assembly mounted on the frame and cooperating with the elevator conveyor to maintain the bales on the latter and against forward tipping, said shoe assembly being extensible and a portion thereof being mounted in connection with the platform for movement therewith whereby to extend or contract said pressure shoe assembly upon elevation or lowering, respectively, of said platform.

A still further object of this invention is to provide a baled hay loader, of the type described, which includes an endless elevator conveyor disposed at a relatively steep incline, a forwardly extending platform onto which the bales tip from the upper portion of the conveyor, a pressure shoe assembly arranged to hold the bales on the conveyor until they reach the tipping point, and a transversely disposed horizontal roller over which the bales tip onto said platform; the pressure shoe assembly being yieldable relative to the conveyor and said roller being mounted to automatically yield with said assembly, whereby to position said roller in correct fulcruming position for each bale as elevated.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a fragmentary enlarged sectional elevation illustrating the presser shoe assembly, together with the fulcrum roller actuated thereby.

Figure 3 is an enlarged fragmentary end view, looking forward, of the fulcrum roller and its mount, detached from the frame.

Figure 4 is an enlarged fragmentary cross section on line 4—4 of Fig. 1.

Figure 5 is an enlarged fragmentary cross section on line 5—5 of Fig. 1.

Figure 1:
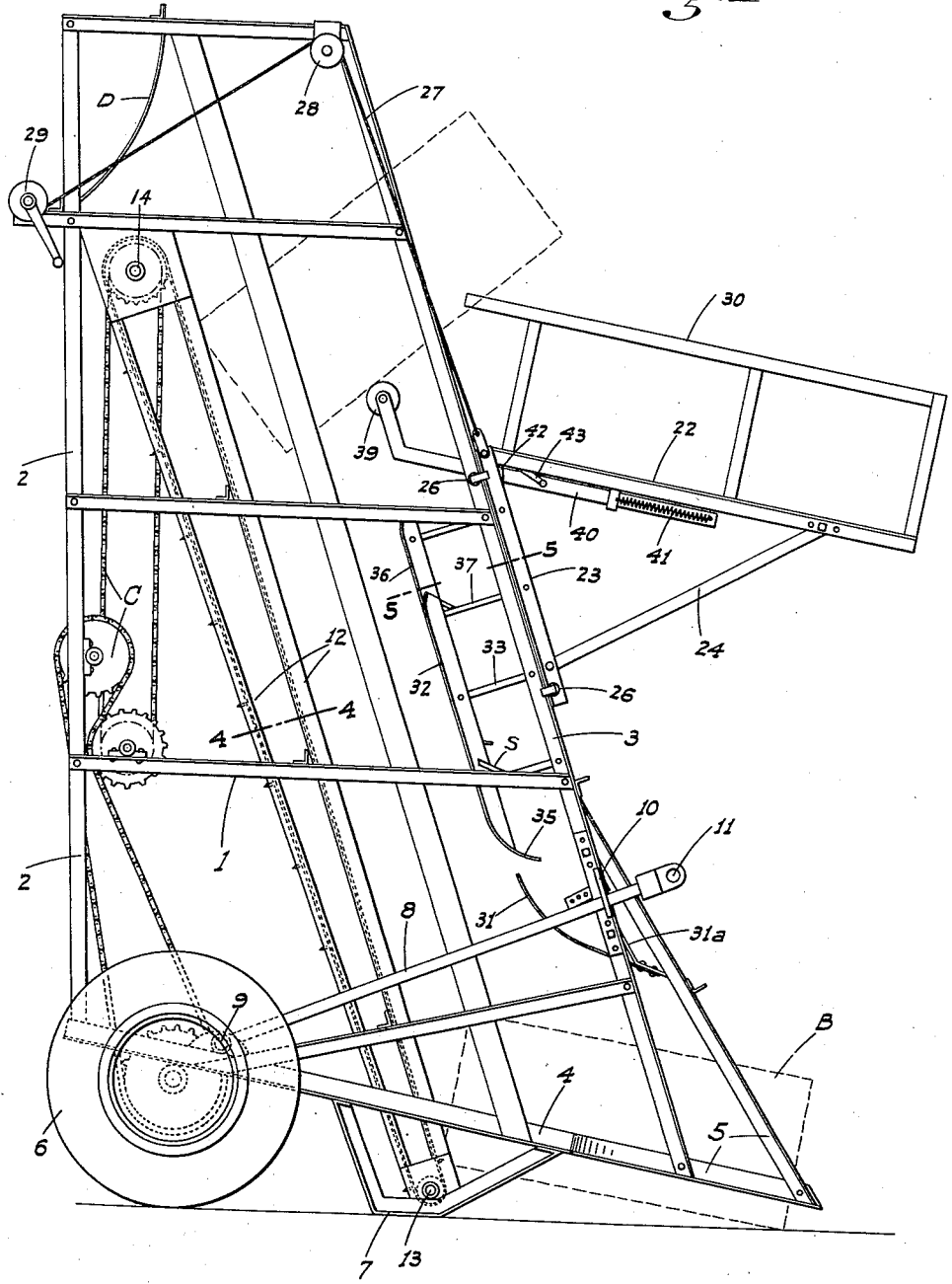
Figure 1 is a side elevation of a baled hay loader embodying the present invention.

Referring now more particularly to the characters of reference on the drawings, the implement comprises a tall four-sided upstanding frame 1 of skeleton construction, said frame including rear corner posts 2 and front corner posts 3. The rear corner posts 2 are normally disposed substantially vertical, whereas the front corner posts 3 extend at a downward and forward incline, as clearly shown in Fig. 1. At the bottom the frame 1 includes, at the sides, transversely spaced bottom beams 4, said beams together with adjacent portions of the sides of the frame being extended and projecting forwardly in divergent relation as guide wings, indicated generally at 5. The front of the frame 1 is open between the wings 5 to permit the passage of a bale B into the upstanding frame for elevation in the manner as will hereinafter appear.

The frame 1 is supported adjacent the back thereof by a pair of transversely spaced ground engaging wheels 6, and skids 7 mounted on the bottom beams 4 intermediate their ends and ahead of the wheels 6 limit downward tilting movement of said beams to prevent the forward ends thereof from digging into the ground with advance of the implement.

A drawbar 8 is pivoted, as at 9, to one of the bottom beams 4 slightly ahead of the axis of the corresponding wheel 6, and such drawbar extends forwardly at an upward incline through a slotted guide 10 secured on the adjacent one of the front corner posts 3. Beyond the guide 10 the drawbar 8 is fitted with a draft connection 11 adapted to be connected with a cooperating draft element (not shown) mounted on the side of the truck bed. It will be seen that when the drawbar 8 is thus connected in draft relation to the truck, the baled hay loader is disposed adjacent but to one side of the truck and moves therewith.

An endless elevator conveyor, indicated generally at 12, is mounted at a relatively steep incline within the frame 1 and with the forward run of said conveyor substantially parallel to but some distance rearwardly of the front of said frame. The conveyor 12 is mounted so that its lower end runs very close but in clearance relation to the ground; said conveyor being supported at its lower end by a cross shaft 13 journaled between the skids 7, while the upper end of the conveyor is carried on a cross shaft 14 some distance below the top of the frame. The conveyor 12 includes transversely spaced endless chains 15 which run about upper and lower sprockets 16 and 17, respectively; the forward runs of said chains being carried in channels 18, while the rear runs are supported by angle irons 19. The endless chains 15 are connected at intervals by longitudinally spaced, transversely extending cross bars 20, from the face of which project a plurality of relatively short bale engaging spikes 21 spaced lengthwise of said bars.

A bale receiving platform 22 projects substantially horizontally in a forward direction from the frame 1, such platform being fixedly mounted at the rear in connection with a carriage 23 mounted for guided vertical movement on the frame 1 at the front; the carriage including transversely spaced adjustable braces 24 which support the forward end of platform 22. The carriage 23 includes side beams 25 corresponding to and movably supported in connection with the front corner posts 3 by means of roller and retaining units 26. Vertical adjustment of the carriage 23, and consequently the platform 22, is accomplished through the medium of cables 27, one connected to the carriage on each side and extending upwardly over a direction changing sheave 28 and thence leading to a normally locked hand winch unit 29 mounted on frame 1 at the back and adjacent the top thereof.

The platform 22 includes an upstanding railing 30 at its forward end and on the side opposite the drawbar 8; such railing preventing accidental escape of bales from the platform upon delivery from the conveyor.

When the implement is in operation and is being advanced by the truck, a bale of hay B lying in the field will pass between the guide wings 5 of the frame and abut at one end against the lower end portion of the forward run of elevator conveyor 12; the conveyor 12 being driven from the wheels 6, with the forward run of said conveyor moving upwardly, by means of a reversing sprocket and chain assembly, indicated generally at C.

As the bale abuts the conveyor the spikes 21 of a crossbar 20 immediately penetrate the bale and begin to elevate the latter at one end. With continued advance of the implement, the bale is raised until it rests directly against the forward run of conveyor 12. A plurality of inwardly and upwardly curved heavy-duty deflector fingers 31 are mounted in transversely spaced unitary relation on the frame 1 at the front end above the point of entry of the bale, such fingers serving to guide the bale, as it is initially raised, onto the elevator conveyor. The fingers 31 are adjustable relative to the conveyor and as a unit by means of transversely spaced upstanding arms 31a including attachment plates 31b arranged for connection with corresponding corner posts 3 at selective points of adjustment.

Once the bale is impaled on the spikes 21, it continues an upward movement on the conveyor, and until the bale reaches the upper end portion of the conveyor it cannot tilt forwardly as the implement includes a unique presser shoe assembly which comprises the following:

A pair of transversely spaced elongated shoes 32 extend lengthwise of the conveyor in parallel, spaced relation to the forward run of the latter. Such shoes are supported in unitary relation and for yielding movement, in a direction away from the conveyor, by means of parallel links 33 which are fixed at their upper ends in connection with cross shafts 34 which extend between the front corner posts 3. The lower ends of the shoes 32 curve forwardly and downwardly, as at 35, to a point beyond and ahead of the upper ends of fingers 31. These shoes, when released after being swung forwardly by a bale, return of their own weight to normal position.

The presser shoe assembly also includes another shoe 36 disposed between the shoes 32 and so that it extends upwardly some distance beyond the upper ends of said shoes. The shoe 36 is supported for yielding movement in a direction away from the conveyor by means of parallel links 37 secured on cross shafts 38 mounted on and extending between the side beams 25 of carriage 23, whereby shoe 36 moves vertically with said carriage and the platform 22. Thus, when the platform is at a relatively high point of adjustment the presser shoe assembly is correspondingly extended or elongated. As the bale B rises with the forward run of the conveyor 12 it engages beneath the shoes 32 and 36, which yield to the necessary extent but which shoes prevent forward tilting of the bale relative to said conveyor. The shoes 32 and 36 are limited in their downward swinging movement, upon escape from the bales, to the full-line position shown in Fig. 2 by means of stops S on said shoes positioned to engage links 33 and 37, respectively.

As the bale reaches the upper portion of the conveyor 12 it escapes the presser shoe assembly and falls forwardly, as shown in dotted lines in Fig. 1, over a horizontal, transversely extending fulcrum roller 39 which is journaled between upstanding end portions of parallel arms 40 which extend forwardly in slidably guided relation beneath the platform 22. Such forward falling is assured by contact of the bale, as it reaches the top of the conveyor and is above roller 39, with deflector members D, curving forwardly and upwardly from behind the upper end of the conveyor above the same. Tension springs 41, connected between the forward ends of arms 40 and the platform, tend to urge said arms and the roller 39 in the direction of the conveyor. However, the roller 39 is maintained substantially the same distance from the conveyor as shoe 36 by the following arrangement:

Transversely spaced radial levers 42 are fixed on and project upwardly from the uppermost one of the shafts 38 on the carriage, and links 43 are pivotally connected between the upper ends of levers 42 and the arms 40. Such lever and link arrangement is constructed so that with a predetermined amount of yielding movement of the shoe 36, the fulcrum roller 39 will move a corresponding distance relative to the conveyor. By reason of this arrangement the roller 39 moves out of the way of the bale as the latter travels up, but is always properly repositioned to engage a bale as the latter tilts forwardly from the conveyor after having moved above and been released from shoe assembly. After the bale falls onto the platform 22 an operator slides it sideways off said platform onto the bed of the truck to which the implement is connected.

The vertical adjustability of the platform also enables the bales to be discharged onto the track at different levels, as the bales become stacked on the truck.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A baled hay loader comprising an upstanding frame supported for movement along the ground, an upstanding but rearwardly inclined endless conveyor mounted on the frame in forwardly facing relation, means to drive the conveyor with the forward run thereof moving upwardly, said conveyor being arranged to engage and elevate initially ground supported bales, means cooperating with conveyor engaged bales to prevent forward tipping thereof until a predetermined elevation is reached, and an elevated platform mounted on the frame to receive the bales from the conveyor at said elevation; said platform being vertically adjustable, and said last named means being mounted in part in connection and movable with the platform.

2. A baled hay loader comprising an upstanding frame supported for movement along the ground, an upstanding but rearwardly inclined endless conveyor mounted on the frame in forwardly facing relation, means to drive the conveyor with the forward run thereof moving upwardly, said conveyor being arranged to engage and elevate initially ground supported bales, means cooperating with conveyor engaged bales to prevent forward tipping thereof until a predetermined elevation is reached, and an elevated platform mounted on the frame to receive the bales from the conveyor at said elevation; there being a vertically adjustable carriage mounted on the frame, and said platform being secured on and movable with said carriage, said last named means being mounted in part in connection and movable with the carriage.

3. A baled hay loader as in claim 2 in which said carriage is disposed at the front of the frame; the platform projecting forwardly from the carriage.

4. A baled hay loader comprising an upstanding frame supported for movement along the ground, an upstanding but rearwardly inclined endless conveyor mounted on the frame in forwardly facing relation, means to drive the conveyor with the forward run thereof moving upwardly, said conveyor being arranged to engage and elevate initially ground supported bales, and the inclination of said conveyor being steep whereby bales thereon tend to tip forwardly, means cooperating with the conveyor preventing such tipping of the bales until a predetermined elevation is reached, the front of the frame being rearwardly inclined and supporting a vertically adjustable carriage, and an elevated platform mounted on the carriage and projecting forwardly in position to receive bales tilted toward said platform from the conveyor when said elevation is reached.

5. A baled hay loader as in claim 4 in which the carriage and platform assembly includes a fulcrum member mounted in connection and movable therewith; said member being disposed between the platform and conveyor transversely of and spaced from the forward run of said conveyor, whereby bales from the conveyor may tilt over said member onto the platform.

6. A baled hay loader comprising an upstanding frame supported for movement along the ground, an unstanding, rearwardly but steeply inclined endless conveyor mounted on the frame in forwardly facing relation, means to drive the conveyor with the forward run thereof moving upwardly, said conveyor being operative to engage and elevate initially ground supported bales and the steepness of said inclined conveyor causing bales thereon to tend to tip forwardly, means cooperating with conveyor engaged bales to prevent forward tipping thereof until a predetermined elevation is reached, and an elevated platform mounted on the frame in position to receive bales which tip forwardly from the conveyor at said predetermined elevation.

7. A baled hay loader comprising an upstanding frame supported for movement along the ground, an upstanding, rearwardly but steeply inclined endless conveyor mounted on the frame in forwardly facing relation, means to drive the conveyor with the forward run thereof moving upwardly, said conveyor being operative to engage and elevate initially ground supported bales and the steepness of said inclined conveyor causing bales thereon to tend to tip forwardly. means cooperating with the conveyor engaged bales to prevent forward tipping thereof until a predetermined elevation is reached, a carriage mounted on the frame for vertical adjustment, and a platform secured on said carriage in position to receive bales which tilt forwardly from the conveyor.

8. A baled hay loader comprising an upstanding frame supported for movement along the ground, an upstanding, rearwardly but steeply inclined endless conveyor mounted on the frame in forwardly facing relation, means to drive the conveyor with the forward run thereof moving upwardly. said conveyor being operative to engage and elevate initially ground supported bales, means cooperating with the conveyor engaged bales to prevent forward tipping thereof until a predetermined elevation is reached, a carriage mounted on said frame at the front for vertical adjustment, a platform secured on and projecting forwardly from the carriage, and a fulcrum member mounted in connection and movable vertically with the platform; said member being disposed between the platform and conveyor transversely of and spaced from the forward run of the latter whereby bales from the conveyor tilt over said member onto the platform.

9. A baled hay loader as in claim 8 in which said fulcrum member comprises a roller; the mount for said roller being yieldable and comprising a pair of transversely spaced arms projecting forwardly from the ends of the roller, guides on the platform for said arms, and a spring connected with one of said arms to yieldably resist movement of the roller away from the conveyor.

10. A baled hay loader comprising an upstanding frame supported for movement along the ground, an upstanding, rearwardly but steeply inclined endless conveyor mounted on the frame in forwardly facing relation, means to drive the conveyor with the forward run thereof moving upwardly, said conveyor being operative to engage and elevate initially ground supported bales, means cooperating with the conveyor engaged bales to prevent forward tipping thereof until a predetermined elevation is reached, a carriage mounted on said frame at the front for vertical adjustment, a platform secured on and projecting forwardly from the carriage, and a fulcrum member mounted in connection and movable vertically with the platform; said member being disposed between the platform and conveyor transversely of and spaced from the forward run of the latter whereby bales from the conveyor tilt over said member onto the platform; said tilt preventing means comprising a presser shoe assembly including a presser shoe mounted in connection with the frame and another presser shoe mounted in connection and movable with the carriage, said shoes extending lengthwise of the conveyor in front thereof.

11. A baled hay loader as in claim 10 in which said other shoe and the fulcrum member are mounted for forward yielding movement; and means connecting said other shoe and the fulcrum member for simultaneous and corresponding movement.

12. A baled hay loader as in claim 10 in which the mount for said other presser shoe comprises parallel links pivotally connected between the carriage and said shoe whereby the latter can yield forwardly, means resisting such yielding movement, the fulcrum member being mounted for yielding movement in the same direction, and means connecting one of said links and the fulcrum member for simultaneous and corresponding yielding movement.

13. A baled hay loader comprising an upstanding frame supported for movement along the ground, an upstanding but rearwardly inclined conveyor mounted on the frame in forwardly facing relation, means to drive the conveyor with the forward run thereof moving upwardly, said conveyor being arranged to engage and elevate initially ground supported bales, and an elevated platform mounted on the frame to receive the bales from the conveyor, the conveyor being steeply inclined, and means cooperating with the conveyor engaged bales to prevent forward tipping thereof until a predetermined elevation is reached, said last named means comprising an elongated bale engaged shoe disposed parallel to and spaced in front of the conveyor, the lower end of said shoe curving forwardly, and a pair of links spaced lengthwise of the conveyor pivotally connected between said shoe and the frame.

14. A baled hay loader comprising an upstanding frame supported for movement along the ground, an upstanding but rearwardly inclined endless conveyor mounted on the frame in forwardly facing relation, means to drive the conveyor with the forward run thereof moving upwardly, said conveyor being arranged to engage and elevate initially ground supported bales, the conveyor being steeply inclined, means cooperating with conveyor engaged bales to prevent forward tilting thereof until a predetermined elevation is reached, and an elevated platform mounted on the frame in position to receive bales which tilt forwardly at said predetermined elevation; said tilt preventing means comprising elongated bale engaging shoes supported in the frame lengthwise and spaced in front of the conveyor, said shoes being yieldable away from the conveyor inedependent of each other, a carriage mounted on the frame for vertical adjustment and on which carriage the platform is supported, one of the shoes being mounted in connection and movable vertically with the carriage, and adjacent ends of said shoes overlapping at all times.

FREDERICK G. LEWIS.